(12) United States Patent
Selekman et al.

(10) Patent No.: US 10,110,651 B2
(45) Date of Patent: Oct. 23, 2018

(54) VIDEO ICONS

(71) Applicant: Facebook, Inc., Menlo Park, CA (US)

(72) Inventors: Aryeh Selekman, San Francisco, CA (US); Aigerim Shorman, San Francisco, CA (US); Jeffrey Huang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 212 days.

(21) Appl. No.: 15/141,698

(22) Filed: Apr. 28, 2016

(65) Prior Publication Data

US 2017/0318067 A1 Nov. 2, 2017

(51) Int. Cl.
*G06F 15/16* (2006.01)
*H04L 29/06* (2006.01)
*H04L 29/08* (2006.01)

(52) U.S. Cl.
CPC ...... *H04L 65/601* (2013.01); *H04L 29/08072* (2013.01); *H04L 67/02* (2013.01); *H04L 67/104* (2013.01); *H04L 67/306* (2013.01); *H04L 67/34* (2013.01)

(58) Field of Classification Search
CPC ............. H04N 21/4788; H04L 29/08072
USPC ........................... 709/203, 220, 228
See application file for complete search history.

(56) References Cited

U.S. PATENT DOCUMENTS

| | | | | |
|---|---|---|---|---|
| 9,242,176 B2* | 1/2016 | Miura | .................... | A63F 13/12 |
| 9,345,966 B2* | 5/2016 | Miura | .................... | A63F 13/12 |
| 9,620,169 B1* | 4/2017 | Nolan | .................. | G11B 27/031 |
| 9,832,418 B2* | 11/2017 | Greene | ................. | H04N 5/765 |
| 9,861,898 B2* | 1/2018 | Miura | .................... | A63F 13/86 |
| 2013/0260896 A1* | 10/2013 | Miura | .................... | A63F 13/12 |
| | | | | 463/42 |
| 2014/0179428 A1* | 6/2014 | Miura | .................... | A63F 13/12 |
| | | | | 463/31 |
| 2015/0296195 A1* | 10/2015 | Greene | ................. | H04N 5/765 |
| | | | | 386/248 |
| 2016/0021179 A1* | 1/2016 | James | ................ | G06F 3/04817 |
| | | | | 709/204 |

* cited by examiner

*Primary Examiner* — Khandh Dinh
(74) *Attorney, Agent, or Firm* — Baker Botts L.L.P.

(57) ABSTRACT

In one embodiment, one or more computer systems of a social-networking system receive an input video associated with a first user of an online social networking system. The computer systems receive, from a client system of a second user of the online social networking system, a request to view content associated with the first user. The computer systems generate one or more output videos based on the input video. The computer systems select one of the one or more output videos. The computer systems provide, for display on the client system, the selected output video together with the requested content.

18 Claims, 8 Drawing Sheets

| | | |
|---|---|---|
| 620a | Video Coding Format | H.264 |
| 620b | Video Bitrate | 50 Mbps |
| 620c | Duration | 9 sec |
| 620d | Frame Size | 1920x1080 |
| 620e | Frame Rate | 25 fps |
| 620f | Resolution | 1920x1080 |
| 620g | Aspect Ratio | 16:9 |
| 620h | Playback Speed | x1 |
| 620i | Playback Direction | Forward Loop x2 |
| 620j | Audio Coding Format | ACC |
| 620k | Audio Bitrate | 150 Kbps |
| 620l | Audio Sample Frequency | 44.1 KHz |
| 620m | Audio Channels | 5.1 |
| 620n | Silent Video | False |

620

| | | |
|---|---|---|
| 630a | Video Coding Format | H.264 |
| 630b | Video Bitrate | 4 Mbps |
| 630c | Duration | 6 sec |
| 630d | Frame Size | 200x200 |
| 630e | Frame Rate | 20 fps |
| 630f | Resolution | 600x600 |
| 630g | Aspect Ratio | 1:1 |
| 630h | Playback Speed | x0.8 |
| 630i | Playback Direction | Forward/Backward Loop |
| 630j | Audio Coding Format | N/A |
| 630k | Audio Bitrate | N/A |
| 630l | Audio Sample Frequency | N/A |
| 630m | Audio Channels | N/A |
| 630n | Silent Video | True |

630

| | | |
|---|---|---|
| 640a | Video Coding Format | H.264 |
| 640b | Video Bitrate | 24 Mbps |

VIDEO ICONS

TECHNICAL FIELD

This disclosure generally relates to user interfaces (UI).

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may receive an input video associated with a first user of the social-networking system. One or more output videos may be generated based on the input video. In some embodiments, an output video may be generated by transcoding the input video. The social-networking system may receive a request from a client system of a second user of the social-networking system to view content associated with the first user. The social-networking system may select one of the output videos to provide to the second user. In some embodiments, the output video may be selected based on video settings of the output video (e.g., bitrate, resolution, etc.). In some embodiments, the output video may be selected based on device metrics for the client system of the second user (e.g., bandwidth, device type, etc.). The social-networking system may provide the selected output video for display to the client system of the second user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates an example set of video templates.

DESCRIPTION OF EXAMPLE EMBODIMENTS

Figure 1:
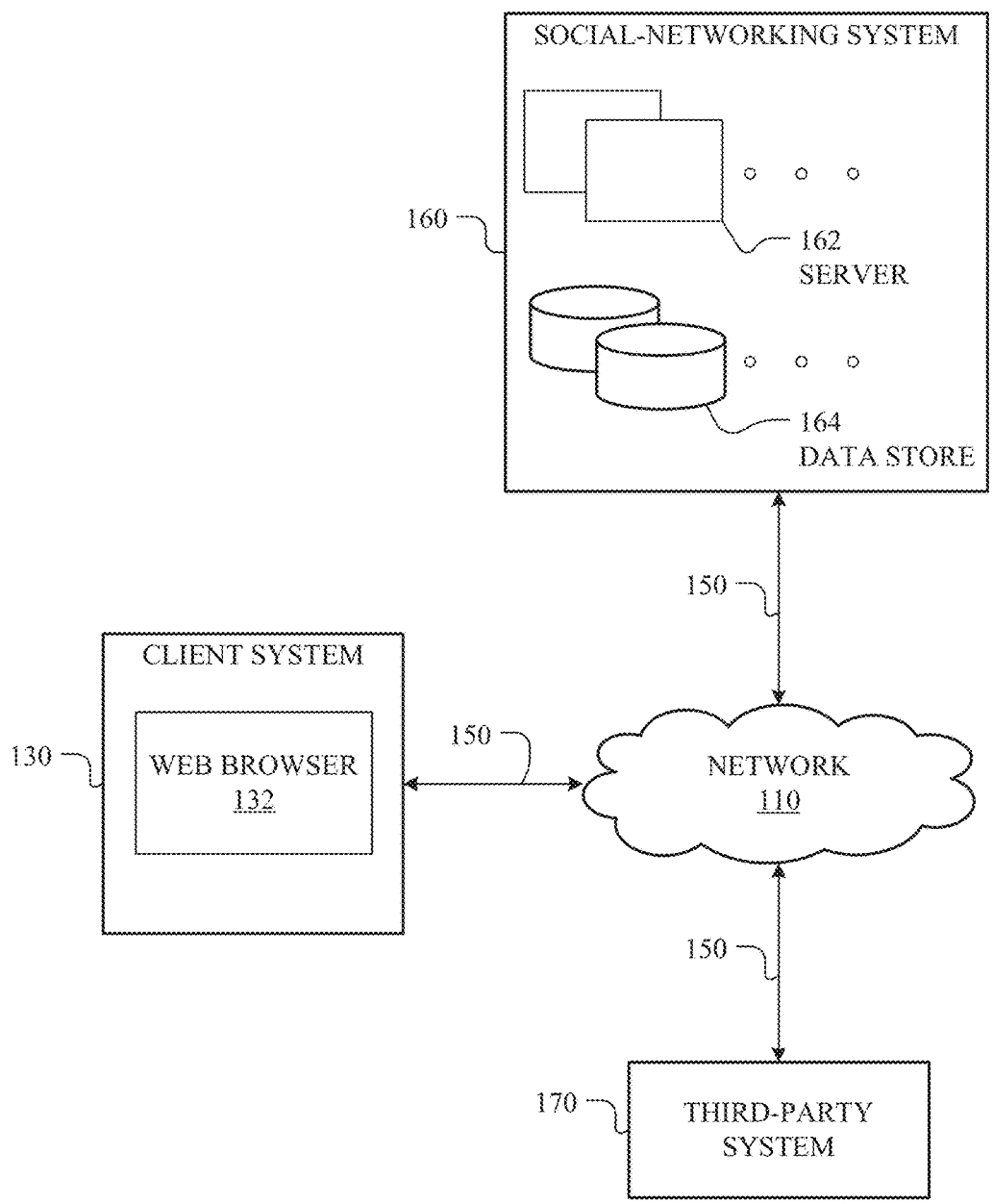
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
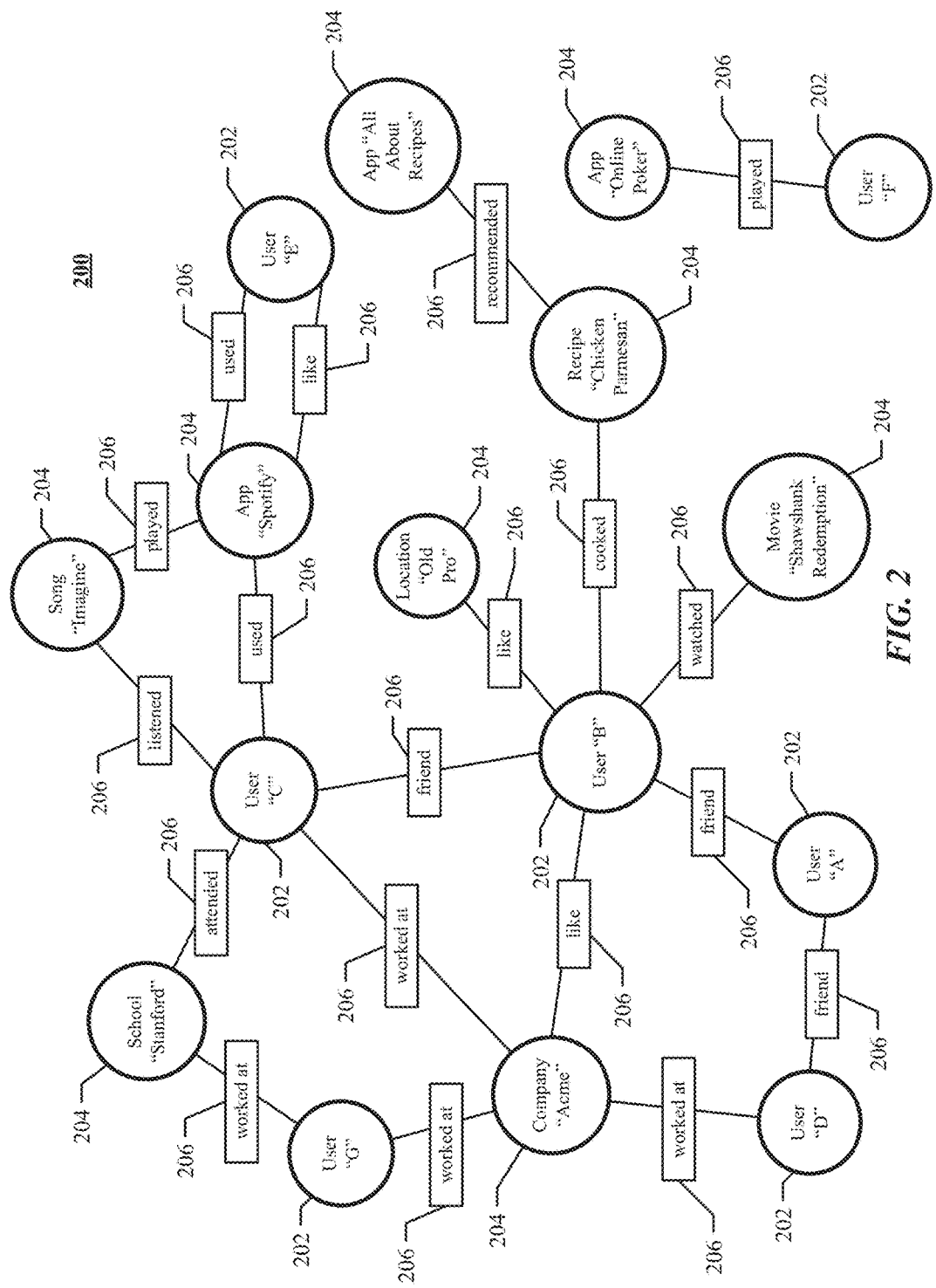
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 01 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3:
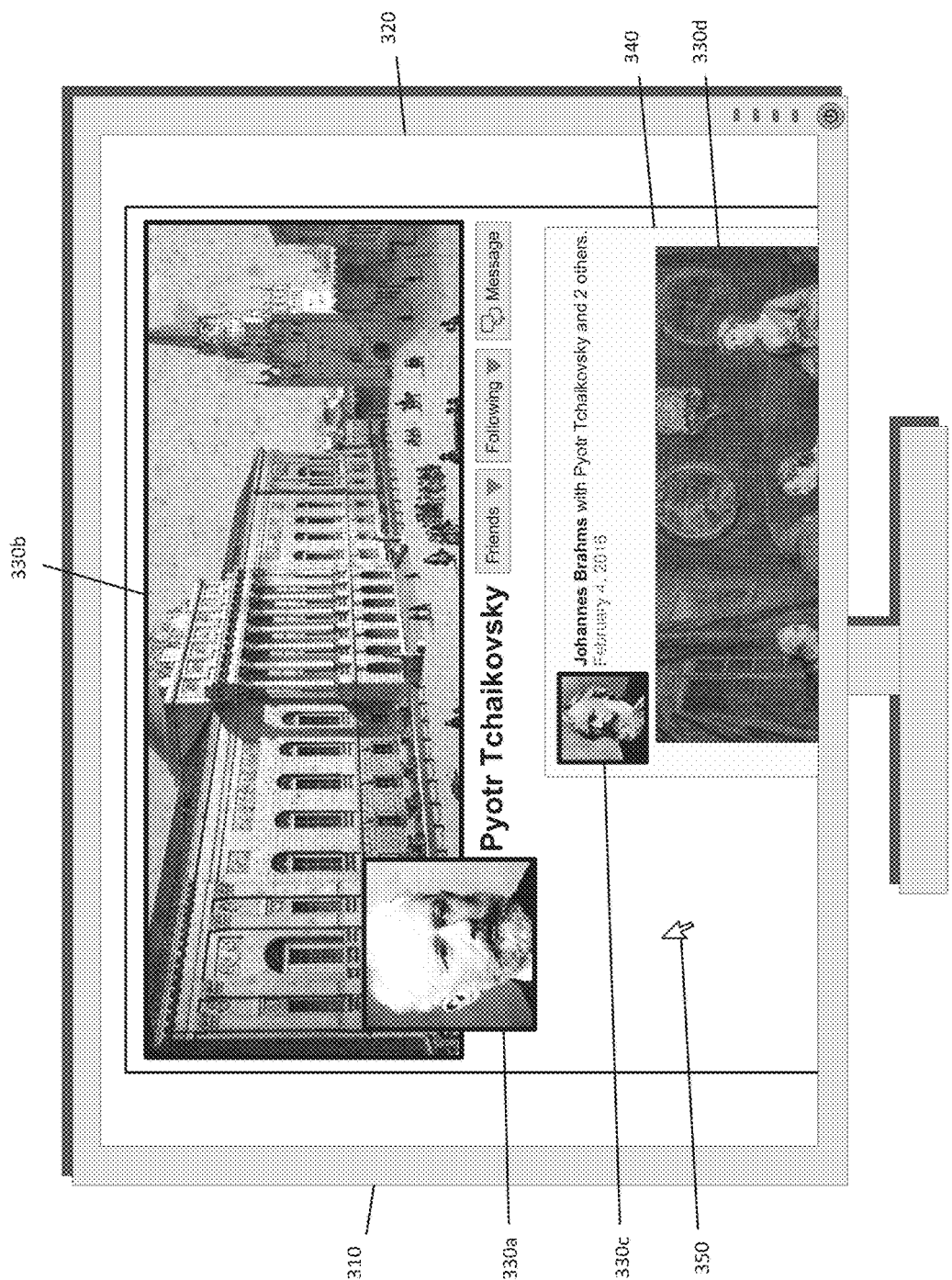
FIG. 3 illustrates an example wireframe of a profile page with example videos.

FIG. 3 illustrates an example wireframe of a profile page with example videos. Computer monitor 310 may display an example profile page associated with user Pyotr Tchaikovsky on display 320. The profile page may display several content objects 330. For example, content object 330*a* may represent the likeness of Tchaikovsky, content object 330*b* may represent a background, content object 330*c* may represent the likeness of user Johannes Brahms, and content object 330*d* may represent a content object selected by Brahms for wall post 340. Although this disclosure describes or illustrates particular UIs with particular configurations of components and videos, this disclosure contemplates any suitable UIs with any suitable configuration of any suitable components and any suitable videos on any suitable computing system. For example, this disclosure contemplates using a mobile device instead of a monitor 310. As another example, this disclosure contemplates using touch gestures instead of cursor 350. Some embodiments may utilize one or more systems, components, elements, functions, methods, operations, or steps disclosed in U.S. patent application Ser. No. 13/799,581 entitled "Live Faces," which is incorporated herein by reference.

In particular embodiments, one or more content objects 330 may be a video. For example, content object 330*a* may be a video of Tchaikovsky, may have a duration of 7 seconds, and may loop by replaying the video from the beginning once the duration has elapsed. In some embodiments, a video may include associated audio. Additionally or alternatively, a video may not include audio.

In particular embodiments, a video may automatically play, pause, or stop when certain conditions are met. For example, content object 330*b* may be a video that is initially paused (e.g., a frame of the video may be displayed as a static image). In this example, content object 330*b* may be configured to automatically begin playing if cursor 350 is within the frame of content object 330. Additionally, content object 330*b* may be configured to pause if cursor 350 moves out of the frame of content object 330*b*. As another example, content object 330*d* may be a video of a party. Additionally, content object 330*d* may extend downward past display 320. Content object 330*d* may be configured to be paused when a portion of content object 330*d* extends beyond display 320 and play when the entirety of content object 330*d* is displayed on display 320.

In particular embodiments, playback of a video may be altered when certain conditions are met. For example, content object 330*c* may be a video that includes associated audio. In this example, the video of content object 330*c* may play without the audio unless cursor 350 is within the frame of content object 330*c*, in which case the associated audio of content object 330*c* may play.

Figure 4:
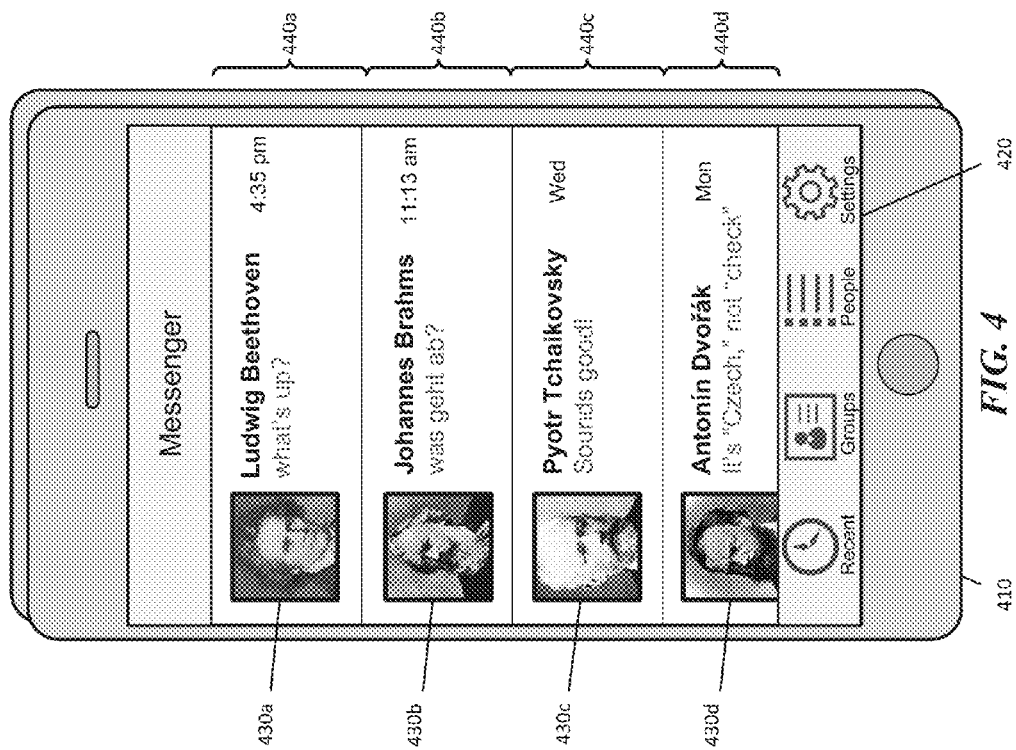
FIG. 4 illustrates an example wireframe of a messenger application with example videos.

FIG. 4 illustrates an example wireframe of a messenger application with example videos. Mobile device 410 may display an example messenger application UI on display 420. The messenger application UI may have content relating to several conversation summaries 440. For example, conversation summary 440*a* may be with user Ludwig Beethoven. Conversation summary 440*a* may include, by way of example and not limitation, the last message received from Beethoven ("what's up?"), the name of the participant in the conversation ("Ludwig Beethoven"), the time or date that a message was last sent or received ("4:35 pm"), and content object 430*a* (representing the likeness of Beethoven). Similarly, in this example, conversation summary 440*b* may represent a conversation with user Johannes Brahms, conversation summary 440*c* may represent a conversation with Tchaikovsky, and conversation summary 440*d* may represent a conversation with user Antonín Dvořák. Further, content object 430*b* may represent the likeness of Brahms, content object 430*c* may represent the likeness of Tchaikovsky, and content object 430*d* may represent the likeness of Dvořák. Although this disclosure describes or illustrates particular UIs with particular configurations of components and videos, this disclosure contemplates any suitable UIs with any suitable configuration of any suitable components and any suitable videos on any suitable computing system.

In particular embodiments, one or more content objects 430 may be a video. Additionally or alternatively, one or more content objects 430 may be a static image. For example, Brahms may not have uploaded a video for use in content object 430*b*. In such a case, content object 430*b* may be a static image instead of a video. In some embodiments, social-networking system 160 may give users access to the use of video in a staggered rollout (e.g., users may receive the ability to upload a video at different times). In this example, Dvořák may be unable to upload a video for use in content object 430*d* and a notification may indicate that Dvořák is unable to upload a video (e.g., a notification may explicitly indicate that video is unavailable, indicate that a video is "coming soon," or any other suitable notification).

Figure 5:
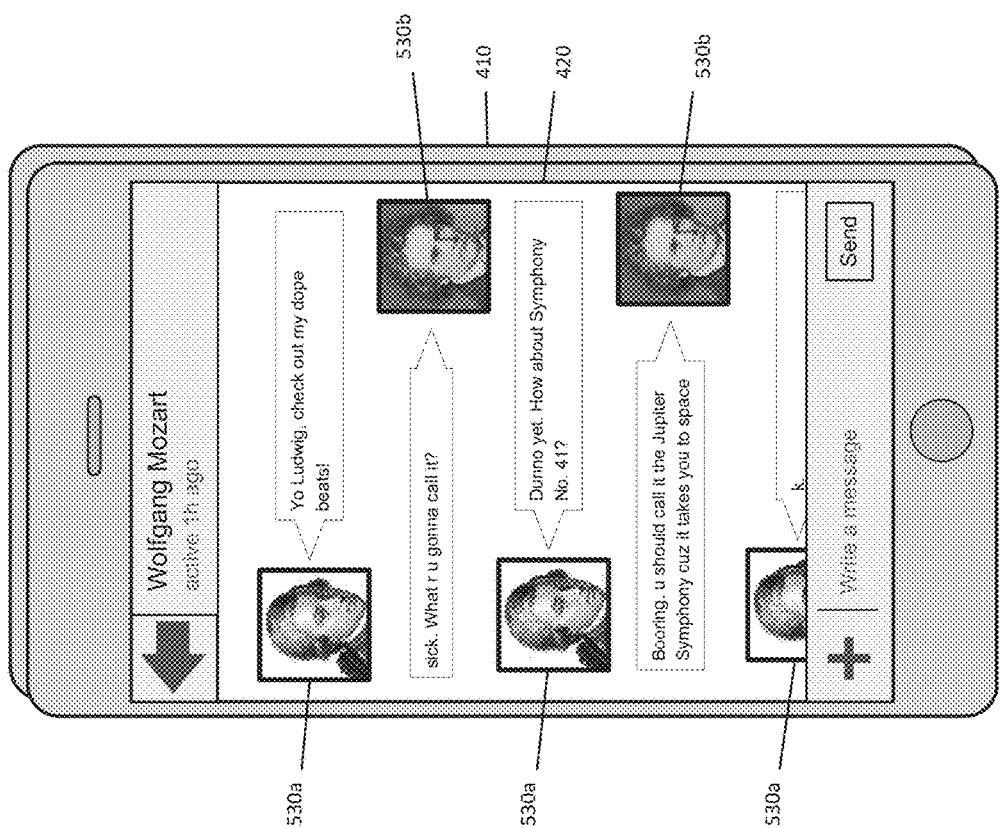
FIG. 5 illustrates an example wireframe of a conversation in a messenger application with videos.

FIG. 5 illustrates an example wireframe of a conversation in a messenger application using videos. In this example, Mozart may be having a conversation with Beethoven. In particular embodiments, one or more content object 530 may be a video. As an example, content object 530*a* may be a video depicting the likeness of Mozart and may be displayed to the left of Mozart's part of the conversation. As another example, content object 530*b* may be a video depicting the likeness of Beethoven and may be displayed to the right of Beethoven's part of the conversation.

FIG. 6 illustrates an example set of video templates 610. In this example, FIG. 6 may depict video template 620, 630, and part of video template 640. Each video template may contain video settings. For example, video template 620 may contain video settings 620a-n, video template 630 may contain video settings 630a-n, and video template 640 may contain at least video settings 640a-b. Although this disclosure describes or illustrates particular video templates with particular video settings and a particular set of video templates with a particular number of type of video templates, this disclosure contemplates any suitable set of video templates containing any suitable number or type of video settings.

In particular embodiments, a video template may include a number of video settings. For example, video template 620 includes the video settings: video coding format 620a, video bitrate 620b, duration 620c, frame size 620d, frame rate 620e, resolution 620f, aspect ratio 620g, playback speed 620h, playback direction 620i, audio coding format 620j, audio bitrate 620k, audio sample frequency 620l, audio channels 620m, and silent video 620n. Although particular video settings may be described herein, this disclosure contemplates any suitable video settings.

In particular embodiments, a video template may be applied to an input video to generate an output video that is based upon the input video and conforms to the video settings of the video template. In some embodiments, applying a video template may include transcoding video (e.g., decoding the input video and encoding the result as an output video). Video coding formats may include, by way of example and not limitation, H.264 (MPEG-4 Part 10), MPEG-2 Part 2, MPEG-4 Part 2, HEVC, THEORA, DIRAC, REALVIDEO, RV40, VP8, VP9, or any other video coding format. A video file may also have a container format (e.g., a metafile format containing different elements of data and metadata) such as AVI, FLASH VIDEO (FLV), OGG, MP4, or any other container format. In some embodiments, an output video may be generated by transcoding an input video. Transcoding may include receiving an input video, decoding the input video, and generating an output video by encoding the decoded input video. For example, an input video may be transcoded to generate an output video according to video template 630. In this example, the output video generated may use the H.264 video coding format as specified by video coding format 630a (e.g., by decoding the input video and encoding the result as an output video using the H.264 video coding format). In some embodiments, transcoding may be done with a codec (e.g., software capable of encoding or decoding video).

In particular embodiments, the output video may be downloaded as a file to a client device and played on the client device, or it may be streamed to the client device. In particular embodiments, a streaming output video may include a portion of an input video altered to have a video bitrate consistent with video template 630. The video bitrate may be the number of bits that must be conveyed per unit of time to stream the video portion of a video. In this example, the output video may have a video bitrate of 4 million bits per second (Mbps), as specified by video bitrate 630b in video template 630. In some embodiments, altering a video bitrate of an input video to conform with a target video bitrate may include using a video compression technique. As an example and not by way of limitation, a video compression technique may include the use of inter-picture prediction, color-space transformations, scalar quantization, spatial prediction, interlaced-scanning, conditional replenishment, intra-frames (i-frames), predicted frames (p-frames), bidirectional frames (b-frames), or any other suitable technique. In some embodiments, a video compression technique may be based on a video coding format. For example, an input video may be compressed using the H.264 compression standard.

In particular embodiments, an output video may include a portion of an input video altered to have a duration consistent with video template 630. In this example, the output video may have a duration of 6 seconds, as specified by duration 630c in video template 630. In some embodiments, an input video with a duration longer than duration 630c may be cropped to produce an output video. The input video may be cropped in any manner to achieve the duration of 6 seconds. For example, the output video may include the first 6 second of the input video, the last 6 seconds of the input video, or noncontiguous portions of the input video that sum to a duration of 6 seconds. In some embodiments, a duration requirement may be enforced by allowing only input videos that conform to the requirement. For example, if an input video with duration of greater than 6 second is uploaded, the uploading user may receive an error message indicating that the input video should be of duration 6 seconds or less. In some embodiments, the playback speed of an input video may be altered to generate an output video that conforms with a duration requirement (e.g., by speeding up or slowing down the playback speed).

In particular embodiments, an output video may include a portion of an input video altered to have a frame size consistent with video template 630. A frame size may be the width and height dimensions of a displayed video (e.g., measured in pixels). In this example, the output video may have a frame size of 200×200 (200 pixels wide by 200 pixels high), as specified by frame size 630d in video template 630. In some embodiments, the individual frames of a video (e.g., the image stills that comprise the video portion) may be cropped to conform with the frame size requirement. In some embodiments, the individual frames of a video may be enlarged to conform with the frame size requirement.

In particular embodiments, an output video may include a portion of an input video altered to have a frame rate consistent with video template 630. A frame rate may be the frequency at which video frames are displayed (e.g., measured in frames per second). In this example, the output video may have a frame rate of 20 frames per second (fps), as specified by frame rate 630e in video template 630. In some embodiments, frames of an input video may be sampled at an interval to conform with the frame rate requirement. For example, an input video with a frame rate of 40 fps may have every other frame sampled to generate an output video with a frame rate of 20 fps. In some embodiments, an input video may be transcoded via a video compression technique, as described above, to generate an output video that conforms to a particular frame rate.

In particular embodiments, an output video may include a portion of an input video altered to have a resolution consistent with video template 630. A resolution may be the number of pixels in the width and height dimensions of the frames of a video. In this example, the output video may have a resolution of 600×600 (600 pixels wide by 600 pixels high), as specified by resolution 630f in video template 630. In some embodiments, a video with a resolution that does not match its frame size may be displayed by sampling pixels. In this example, the output video may have a resolution of 600×600, but a frame size of 200×200, which may be achieved by sampling every third pixel along each dimension.

In particular embodiments, an output video may include a portion of an input video altered to have an aspect ratio consistent with video template 630. An aspect ratio may be a proportional relationship between the width and height of a video. In this example, the output video may have an aspect ratio of 1:1 (indicating that the frame size width and height are in equal proportion), as specified by aspect ratio 630g in video template 630.

In particular embodiments, an output video may include a portion of an input video with an altered playback speed. For example, an output video may have the same playback speed as an input video if video template 620 is applied, as that template has playback speed 620h factor of 1. As another example, as output video may play at 80% of the speed compared to the input video if video template 630 is applied, as that template has a playback speed 630h factor of 0.8. An altered playback speed may increase or decrease the playback speed of a video.

In particular embodiments, an output video may include a portion of an input video with an altered playback direction. For example, a playback direction may be forward (e.g., the frames of the output video proceed in the same order as the frames of the input video). As another example, if video template 620 is applied, the output video may play twice as a loop in the forward direction based on "Forward Loop ×2" in playback direction 620i. As another example, a playback direction may be backward (e.g., the frames of the output video may proceed in the opposite order as the frames of an input video). In some embodiments, a playback direction may include a loop. For example, an output video may include a portion of the input video as a loop that proceeds from a starting frame in the portion of the input video forward through an ending frame in the portion of the input video (e.g., proceed by displaying frames between the starting frame and ending frame) and then jumps back to the starting frame (e.g., the output video may jump from the ending frame to the beginning frame without playing intervening frames). As another example, a loop may proceed from the ending frame in the portion of the input video backward (e.g., the frames of the output video may proceed in reverse order compared to the frames of the input video) through the starting frame in the portion of the input video and then jumps back to the ending frame. As another example, a loop may proceed from a starting frame in the portion of the input video forward through an ending frame in the portion of the input video and then proceed backwards back to the starting frame. In this example, if the portion of the input video has frames 1, 2, and 3, then the loop may include playing video frames 1, 2, 3, 2, and 1. As another example, if video template 630 is applied, then the output video may proceed from a starting frame in the portion of the input video forward through an ending frame in the portion of the input video and then proceed backwards back to the starting frame based on "Forward/Backward Loop" in playback direction 630i. Although particular loops may be described, this disclosure contemplates the use of any suitable loop.

In particular embodiments, an input video may include associated audio. In some embodiments, a video template may include video settings relating to audio associated with a video. In some embodiments, applying a video template may include transcoding audio. Audio coding formats may include, by way of example and not limitation, Advanced Audio Coding (ACC), MPEG-1 or MPEG-2 Audio Layer III (MP3), WINDOWS Media Audio (WMA), Free Lossless Audio Codec (FLAC), or any other audio coding format. A video file may also have a container format (e.g., a metafile format containing different elements of data and metadata) such as AVI, FLASH VIDEO (FLV), OGG, MP4, or any other container format. In particular embodiments, audio associated with a video may be included in a container format. In some embodiments, other video settings associated with audio may be included in a video template. For example video settings may include audio bitrate (e.g., for streaming video, the number of bits that must be conveyed per unit of time to stream audio), audio sample frequency (e.g., a rate at which audio is sampled), audio channels (e.g., how many separate audio tracks are included in the audio), or any other video setting relating to audio. In some embodiments, a video template may include an option to remove audio. For example, video template 630 has silent video 630n set to "TRUE." Based on this, the output video that results from applying video template 630 may include no associated audio track. In this example, audio coding format 630j, audio bitrate 630k, audio sample frequency 630l, and audio channels 630m may not be applicable (indicated by "N/A") as the output video will have no associated audio.

Figure 7:
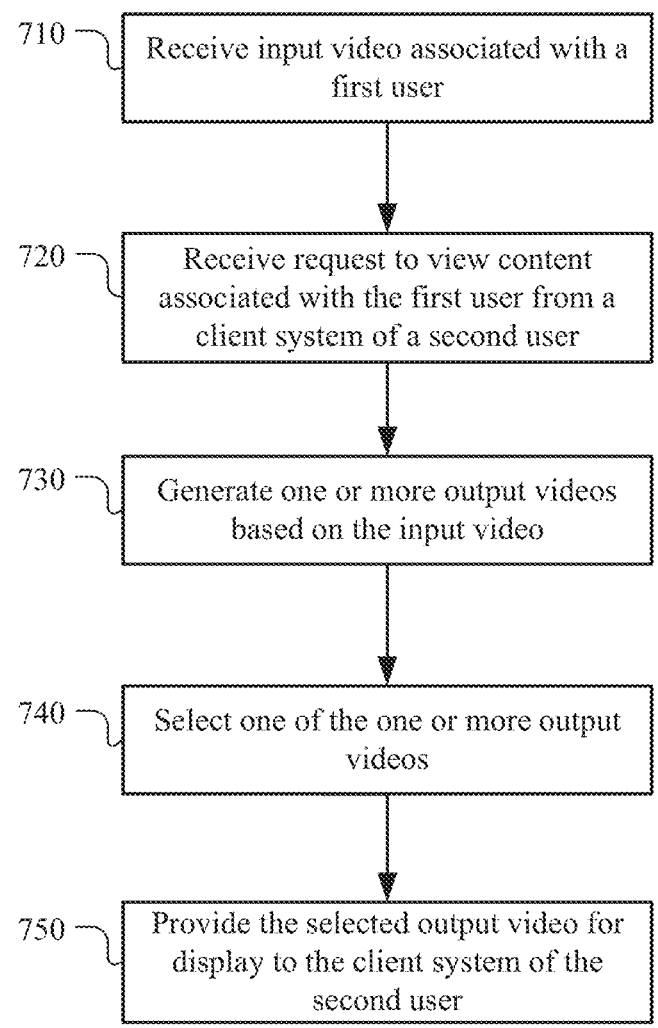
FIG. 7 illustrates an example method for providing to a user's client system an output video generated based on an input video.

FIG. 7 illustrates an example method 700 for providing to a user's client system an output video generated based on an input video. In step 710, social-networking system 160 may receive an input video associated with a first user of social-networking system 160. In some embodiments, social-networking system 160 may receive an input video of any type. In some embodiments, social-networking system 160 may require that an input video conform to particular video settings. For example, social-networking system 160 may require that input videos be no longer than 6 seconds in duration.

In step 720, social-networking system 160 may receive a request from a client system of a second user to view content associated with the first user. In some embodiments, the request may be from an application running on the client system. For example, the second user may request to view content associated with the first user by using a software application running on the client system. As another example, the second user may request to view the content using a messenger application, such as the example wireframe of a messenger application depicted in FIG. 4. In some embodiments, the second user may request to view content associated with the first user by using a web browser. For example, the second user may request to view the example wireframe of a profile page depicted in FIG. 3 using a web browser. In some embodiments, the second user may request to view content associated with the first user by an operating system. Although particular means of the second user using a client system to request to view content associated with the first user maybe described, this disclosure contemplates any suitable means of requesting to view content associated with the first user.

In step 730, social-networking system 160 may generate one or more output videos based on the input video. In some embodiments, the output video may include at least a portion of the input video. In some embodiments, an output video may include a portion of the input video that has an altered video bitrate, video coding format, frame size, frame rate, resolution, aspect ratio, duration, playback speed, playback direction, audio coding format, audio sample frequency, number of audio channels, or audio bitrate. For example, as described above, the output video may be generated by applying a transcoding template to the input video. As another example, the output video may be in the GRAPHICS INTERCHANGE FORMAT (GIF) and include frames of the input video. As another example, an output video may be generated by applying a filter (e.g., a black and white filter), by applying a spatial transformation (e.g., mirroring the image frames of a video about an axis), or by adding a border frame around the video (e.g., an image along the outer part of the video frame). In some embodiments, an output video may be identical to the input video. In some embodiments, an output video may be generated based on social graph information for the first user. For example, if a user node associated with the first user is connected to a user node for a user with a particular client system, an output video may be generated that is suitable for that client system. In some embodiments, an output video may be generated with video settings (e.g., playback direction, bitrate, etc.) based on an affinity coefficient, membership of a user in a group, a degree-of-separation, or a user's privacy settings. For example, if a user is in a group related to the SAN FRANCISCO GIANTS baseball team, then an output video may include adding a border around the input video using the team colors (orange and black) and logo of the SAN FRANCISCO GIANTS.

In particular embodiments, an output video may be generated in response to receiving a request to view content associated with the first user. In some embodiments, described more below, an output video may be selected based on device metrics for the client system of the second user. In such embodiments, an output video may be generated in response to receiving a request to view content associated with the first user by generating an output video appropriate for the client system initiating the request.

In particular embodiments, an output video may be generated in response to social-networking system 160 receiving the input video. In some embodiments, output videos may be generated by applying a set of transcoding templates to the input video. As an example and not by way of limitation, an input video with a resolution of 1920×1080 and a total bitrate (e.g., the sum of the video bitrate and audio bitrate) of 70 Mbps may have a set of transcoding templates applied to produce an output video with a resolution of 1920×1080 and a total bitrate of 4000 Kbps, an output video with a resolution of 1280×720 and a total bitrate of 2500 Kbps, and an output video with a resolution of 848×480 and a total bitrate of 1600 Kbps. Additionally or alternatively, output videos may be generated at any appropriate time. In some embodiments, as described above, an output video may have an altered playback direction that includes a loop.

In step 740, one of the output videos may be selected. In particular embodiments, an output video may be selected based at least in part on device metrics for the client system. Device metrics may include a display resolution, bandwidth, screen size, computer processing unit (CPU) metric (e.g., brand, model, number of cores, number of threads, operating frequency, cache size, etc.), graphics processing unit (GPU) metric (e.g., brand, model, number of cores, number of threads, operating frequency, cache size, etc.), power available to the client system, information regarding one or more plugins installed on the client system, information regarding one or more applications installed on the client system, device type for the client system, or any other suitable device metric. As an example, social-networking system 160 may determine device metrics for a client system that indicate the device type of the client system is a mobile phone SAMSUNG GALAXY S5 running version 4.2.2 of the ANDROID operating system, that the display resolution is 1080×1920, that the screen size is 5.1 inches, that the user is requesting content associated with the first user through the CHROME browser, that the client system does not have the FLASH plugin available, that the power available indicates that the battery of the client device currently has 23% charge, that the client system uses a Quad-core 2.5 GHz Krait 400 CPU, that the client system uses an ADRENO 330 GPU, and that the client system has a bandwidth of 7 Mbps for downloads and 3 Mbps for uploads. In some embodiments, an output video may be selected at least in part based on the video bitrate, audio bitrate, frame size, resolution, or any other suitable video setting of the selected output video. In some embodiments, an output video may be selected based on a comparison of device metrics for the client system to video settings of the selected output video. For example, an output video may be selected with a total bitrate that is less than the bandwidth of the client system and by ensuring that the selected video does not require the FLASH plugin if the FLASH plugin is not available on the client system. In some embodiments, an output video may be selected based on social graph information (e.g., an affinity coefficient, membership of a user in a group, a degree-of-separation, or a user's privacy settings). For example, a user may select privacy settings that determines how a particular video can be shared, and an output video that conforms to the user's privacy settings may be selected.

In step 750, social-networking system 160 may provide the selected output video together with the requested content for display on the client system. For example, the selected output video may be transmitted to an application or web browser running on the client system, which may then display the selected output video. In some embodiments, social-networking system 160 may detect a change in bandwidth or power available to the client system while the selected output video is being displayed. Social-networking system 160 may then select a different one of the one or more output videos and provide the selected different output video to the client system. The different selected output video may, as an example and not by way of limitation, have a lower or higher bitrate or resolution. In some embodiments, a different selected output video may be provided in a way as to seamlessly substitute the different selected output video for the prior selected output video (e.g., without buffering, stuttering, etc.).

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for providing video associated with a user including the particular steps of the method of FIG. 7, this disclosure contemplates any suitable method for providing a video to a user including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
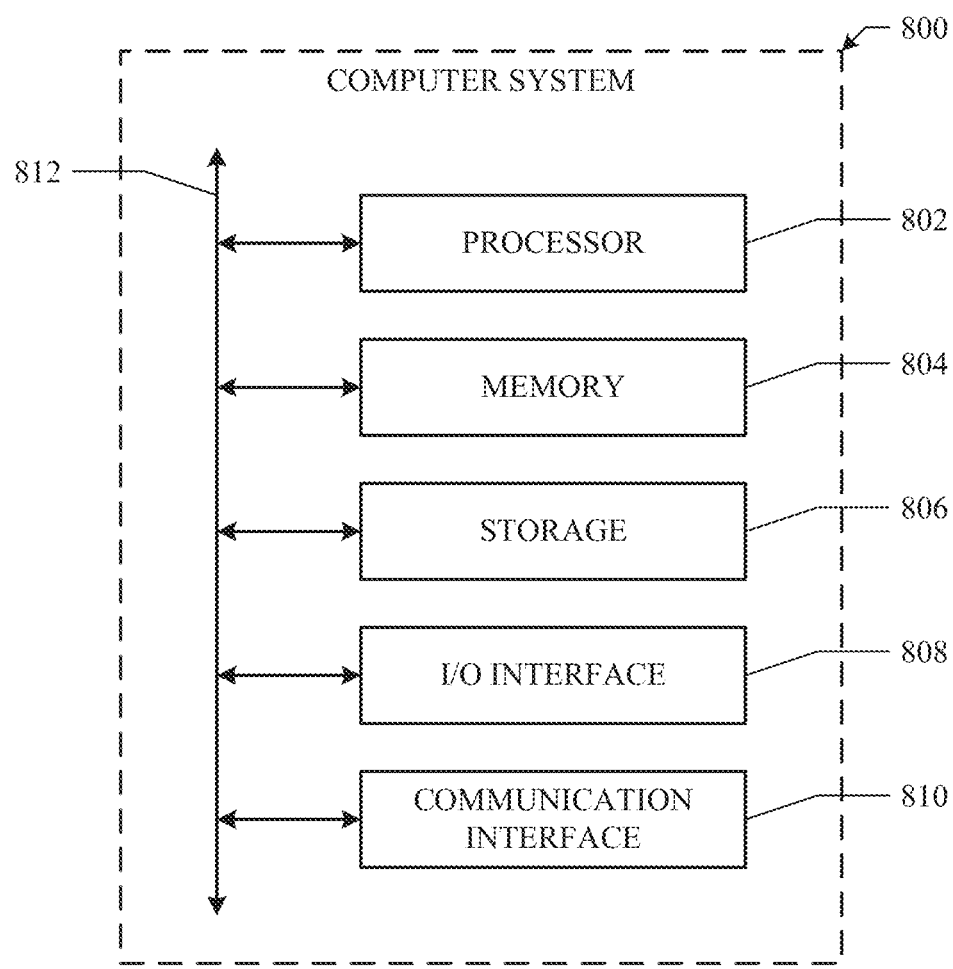
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving an input video associated with a first user of an online social networking system;
   receiving, from a client system of a second user of the online social networking system, a request to view content associated with the first user;
   generating one or more output videos based on the input video, wherein the one or more output videos are generated by applying a predefined video template, and the predefined video template includes a plurality of video settings and transcodes the input video to the one or more output videos;

selecting one of the one or more output videos, wherein the selected output video proceeds from a starting frame in a portion of the input video forward through an ending frame in the portion of the input video and then jumps back to the starting frame, or proceeds from the ending frame in the portion of the input video backward through the starting frame in the portion of the input video and then jumps back to the ending frame, or proceeds from the starting frame in the portion of the input video forward through the ending frame in the portion of the input video and then proceeds backwards back to the starting frame; and providing, for display on the client system, the selected output video together with the requested content.

2. The method of claim 1, wherein the request to view content associated with a first user comprises a request to view a profile page of the first user.

3. The method of claim 1, further comprising determining a device metrics for the client system of the second user, wherein the selecting one of the one or more output videos is based at least in part on the device metrics.

4. The method of claim 3, wherein the selecting one of the one or more output videos is further based at least in part on the video bitrate, audio bitrate, frame size, or resolution of the selected output video.

5. The method of claim 3, wherein the device metrics comprise a display resolution, bandwidth, screen size, computer processing unit metric, graphics processing unit metric, power available to the client system, information regarding one or more plugins installed on the client system, information regarding one or more applications installed on the client system, or device type for the client system.

6. The method of claim 1, wherein the selected output video comprises at least the portion of the input video, and wherein the portion has an altered video bitrate, video coding format, frame size, frame rate, resolution, aspect ratio, duration, playback speed, playback direction, audio coding format, audio sample frequency, number of audio channels, or audio bitrate.

7. The method of claim 6, wherein the playback direction comprises a loop.

8. The method of claim 1, wherein the generating one or more output videos is performed in response to the receiving a request to view content associated with a first user.

9. The method of claim 1, wherein the generating one or more output videos is performed in response to the receiving an input video.

10. The method of claim 1, further comprising:
detecting a change in bandwidth or power available to the client system;
selecting a different one of the one or more output videos; and
providing, for display on the client system, the selected different output video together with the requested content.

11. One or more computer-readable non-transitory storage media embodying software that is operable when executed to:
receive an input video associated with a first user of an online social networking system;
receive, from a client system of a second user of the online social networking system, a request to view content associated with the first user;

generate one or more output videos based on the input video, wherein the one or more output videos are generated by applying a predefined video template, and the predefined video template includes a plurality of video settings and transcodes the input video to the one or more output videos;

select one of the one or more output videos, wherein the selected output video proceeds from a starting frame in a portion of the input video forward through an ending frame in the portion of the input video and then jumps back to the starting frame, or proceeds from the ending frame in the portion of the input video backward through the starting frame in the portion of the input video and then jumps back to the ending frame, or proceeds from the starting frame in the portion of the input video forward through the ending frame in the portion of the input video and then proceeds backwards back to the starting frame; and provide, for display on the client system, the selected output video together with the requested content.

12. The media of claim 11, wherein the request to view content associated with a first user comprises a request to view a profile page of the first user.

13. The media of claim 11, wherein the software is further operable when executed to determine a device metrics for the client system of the second user,
wherein the selecting one of the one or more output videos is based at least in part on the device metrics.

14. The media of claim 13, wherein the selecting one of the one or more output videos is further based at least in part on the video bitrate, audio bitrate, frame size, or resolution of the selected output video.

15. The media of claim 13, wherein the device metrics comprise a display resolution, bandwidth, screen size, computer processing unit metric, graphics processing unit metric, power available to the client system, information regarding one or more plugins installed on the client system, information regarding one or more applications installed on the client system, or device type for the client system.

16. The media of claim 11, wherein the selected output video comprises at least the portion of the input video, and wherein the portion has an altered video bitrate, video coding format, frame size, frame rate, resolution, aspect ratio, duration, playback speed, playback direction, audio coding format, audio sample frequency, number of audio channels, or audio bitrate.

17. The media of claim 16, wherein the playback direction comprises a loop.

18. A system comprising: one or more processors; and a memory coupled to the processors comprising instructions executable by the processors, the processors being operable when executing the instructions to:
receive an input video associated with a first user of an online social networking system;
receive, from a client system of a second user of the online social networking system, a request to view content associated with the first user;
generate one or more output videos based on the input video, wherein the one or more output videos are generated by applying a predefined video template, and the predefined video template includes a plurality of video settings and transcodes the input video to the one or more output videos;
select one of the one or more output videos, wherein the selected output video proceeds from a starting frame in a portion of the input video forward through an ending frame in the portion of the input video and then jumps back to the starting frame, or proceeds from the ending frame in the portion of the input video backward through the starting frame in the portion of the input video and then jumps back to the ending frame, or proceeds from the starting frame in the portion of the input video forward through the ending frame in the portion of the input video and then proceeds backwards back to the starting frame; and provide, for display on the client system, the selected output video together with the requested content.

* * * * *